United States Patent
Oe et al.

(10) Patent No.: US 8,696,374 B2
(45) Date of Patent: Apr. 15, 2014

(54) POWER FEEDING CONTROL DEVICE

(75) Inventors: Hironobu Oe, Mie (JP); Shinichi Nakamura, Mie (JP); Takao Akioka, Mie (JP); Noboru Inagaki, Mie (JP); Haruhiko Mihara, Mie (JP)

(73) Assignee: Panasonic Corporation, Osaka (JP)

( * ) Notice: Subject to any disclaimer, the term of this patent is extended or adjusted under 35 U.S.C. 154(b) by 84 days.

(21) Appl. No.: 13/463,993

(22) Filed: May 4, 2012

(65) Prior Publication Data

US 2012/0282798 A1 Nov. 8, 2012

(30) Foreign Application Priority Data

May 6, 2011 (JP) .................................. 2011-103527

(51) Int. Cl.
*H01R 13/62* (2006.01)

(52) U.S. Cl.
USPC ......................................................... 439/321

(58) Field of Classification Search
USPC ................................................ 439/321, 320
See application file for complete search history.

(56) References Cited

U.S. PATENT DOCUMENTS

| | | | | |
|---|---|---|---|---|
| 2,890,434 A | * | 6/1959 | Ray et al. | 439/321 |
| 5,718,831 A | * | 2/1998 | Zigliotto | 219/121.48 |
| 2007/0049093 A1 | * | 3/2007 | Otten et al. | 439/321 |
| 2010/0151717 A1 | * | 6/2010 | Bulow | 439/321 |

FOREIGN PATENT DOCUMENTS

JP  2009-240053  10/2009

* cited by examiner

*Primary Examiner* — Gary Paumen
(74) *Attorney, Agent, or Firm* — Bacon & Thomas, PLLC

(57) ABSTRACT

A power feeding control device is provided with a main body accommodating an electric circuit for controlling power supply to a motor vehicle from a power source. First and second cables to be connected to the motor vehicle and the power source extend from the longitudinally opposite ends of the main body, respectively. The second cable includes a plug having a plug body accommodating a second contact electrically connected to a first contact provided in the main body, and a retaining ring attached to the plug body such that the retaining ring is rotatable about an axial direction of the plug body while being restricted to move in the axial direction. By screwing the retaining ring onto a thread portion of the main body, the retaining body is detachably attached to the main body in the state that the second contact is electrically connected to the first contact.

5 Claims, 13 Drawing Sheets

POWER FEEDING CONTROL DEVICE

FIELD OF THE INVENTION

The invention relates to a power feeding control device.

BACKGROUND OF THE INVENTION

In recent years, a motor vehicle driven by an electric motor, such as a plug-in hybrid electric vehicle (PHEV) or an electric vehicle (EV), has been widespread. In a charging mode of the motor vehicle, a power feeding control device is used for controlling power supply to the motor vehicle from power source (e.g., Japanese Patent Application Publication No. 2009-240053 (JP2009-240053A)).

The power feeding control device disclosed in JP2009-240053A includes a main body accommodating a control circuit for controlling power supply to a motor vehicle, wherein a power source side cable to be connected to a power outlet extends from one end of the main body; and a vehicle side cable to be connected to a motor vehicle extends from the other end of the main body.

In such power feeding control device used in a garage where the motor vehicle is parked, the power source side cable and the vehicle side cable may be damaged if the motor vehicle rides on them placed on the ground. In the conventional power feeding control device, it may be difficult to replace the power supply side cable and the vehicle side cable. So, in cases where any one of the cables is damaged, the whole power feeding control device must be replaced, which is uneconomical.

SUMMARY OF THE INVENTION

In view of the above, the present invention provides a power feeding control device whose cable can be easily replaced with new one.

In accordance with an aspect of the present invention, there is provided a power feeding control device including a first cable connected to a motor vehicle and a second cable connected to a power source, each extending from a main body that accommodates a control circuit for controlling power supply to the motor vehicle from the power source and includes a first contact. At least one of the first and second cables is provided with: a second contact electrically connected to the first contact of the main body; and a retaining part detachably attached to the main body by screwing to retain the state where the second contact is electrically connected to the first contact.

In the power feeding control device, one of the retaining part and the main body may be provided with a protrusion part protruding toward the other thereof and the other of the retaining part and the main body may be provided with a locking part for locking the protrusion part so as to hold the state where the retaining part is screwed onto the main body to a position where the first contact is electrically connected with the second contact.

In this case, the one of the retaining part and the main body may include a biasing part for biasing the protrusion part toward the other of the retaining part and the main body, wherein the locking part is formed to have a recessed shape into which the protrusion part is to be inserted.

In this power feeding control device, the protrusion part may be provided such that a peripheral portion thereof is covered by the one of the retaining part and the main body, and an opening for exposing the protrusion part, which is inserted into the recess shaped locking part, is provided in a surface of the other of the retaining part and the main body.

In accordance with another aspect of the present invention, there is provided a power source side cable adapted to be disconnectably connected to the main body that accommodates the electric circuit for controlling the power supply to the motor vehicle from the power source and includes the first contact. The power source side cable includes: a plug body accommodating therein the second contact to be connected to the first contact of the main body; and a retaining part attached to the plug body such that the retaining part is rotatable about an axial direction of the plug body while being restricted to move in the axial direction, wherein the retaining part is attached to the main body by screwing to retain the state where the first contact is electrically connected to the second contact.

The retaining part may be provided with a protrusion part protruding toward the main body, and the protrusion part may be locked to a locking part provided in the main body in the state that the retaining part is screwed onto the main body to the position where the first contact is electrically connected with the second contact.

Alternatively, the retaining part may be provided with a locking part for locking a protrusion part provided in the main body to protrude toward the retaining part. In this case, the locking part locks the protrusion part provided in the main body in the state that the retaining part is screwed onto the main body to the position where the first contact is electrically connected with the second contact.

According to the present invention, the cable of the power feeding control device can be easily replaced with new one.

BRIEF DESCRIPTION OF THE DRAWINGS

The objects and features of the present invention will become apparent from the following description of embodiments, given in conjunction with the accompanying drawings, in which:

FIGS. 9A and 9B show a modified example of the above, wherein FIG. 9A is a perspective view showing the state before the second cable is connected to the main body, and FIG. 9B is a perspective view showing the state after the second cable is connected to the main body; and, FIG. 10 is a circuit block diagram of the power feeding control device.

DETAILED DESCRIPTION OF THE EMBODIMENT

A power feeding control device in accordance with an embodiment of the present invention will be described with reference to FIGS. 1A to 10.

The power feeding control device 1 of the present embodiment, which is of a portable type, is used for controlling power supply to an electric storage device in a motor vehicle from a power source (e.g., a commercial alternating current power source). The motor vehicle include, for example, an electric vehicle (EV) equipped only with the motor as a power source, and a hybrid electric vehicle (HEV) and a plug-in hybrid electric vehicle (PHEV) in which an engine and a motor are employed together as a power source. The motor vehicle includes, as a power source for driving the motor, a secondary battery such as a rechargeable lithium-ion battery and a charging circuit for charging the secondary battery. The secondary battery and the charging circuit constitute the electric storage device.

Figure 1A:
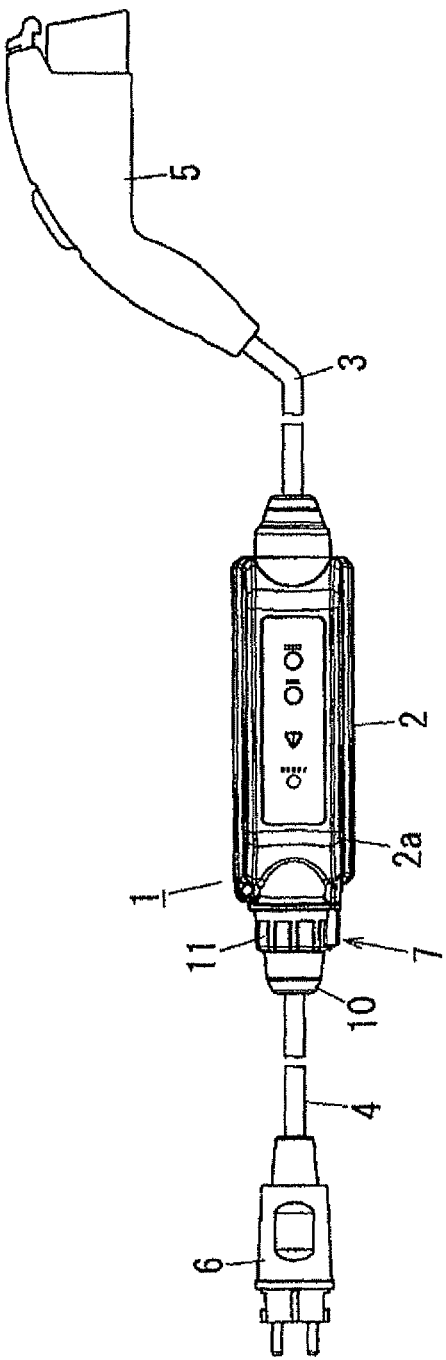
FIG. 1A is an external view of a power feeding control device in accordance with an embodiment of the present invention.
Figure 1B:
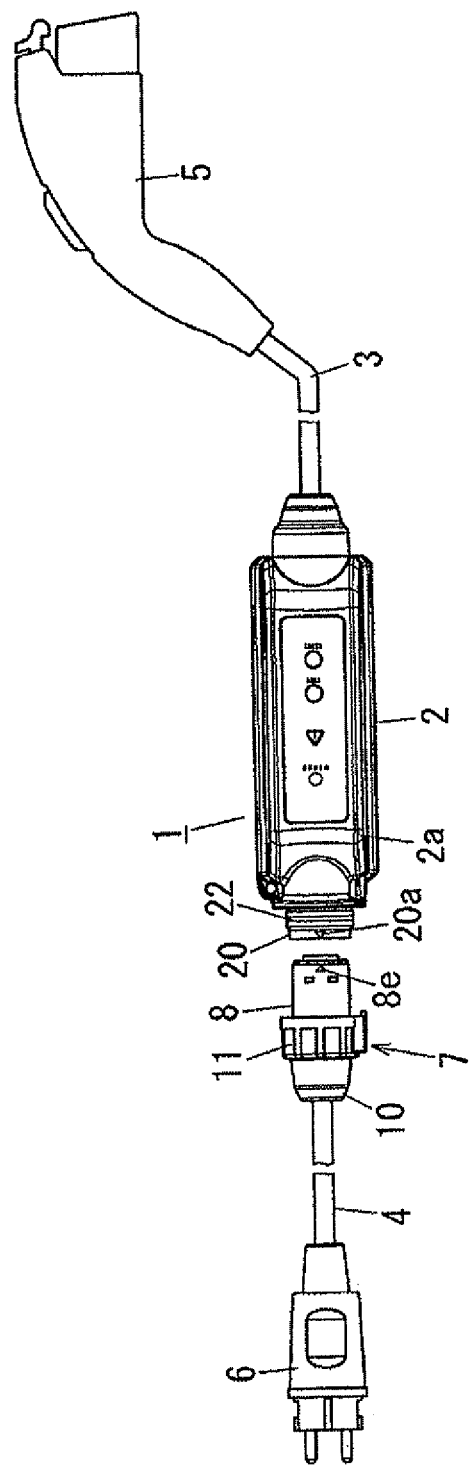
FIG. 1B is an external view of the power feeding control device in the state where a second cable is disconnected therefrom.
Figure 2A:
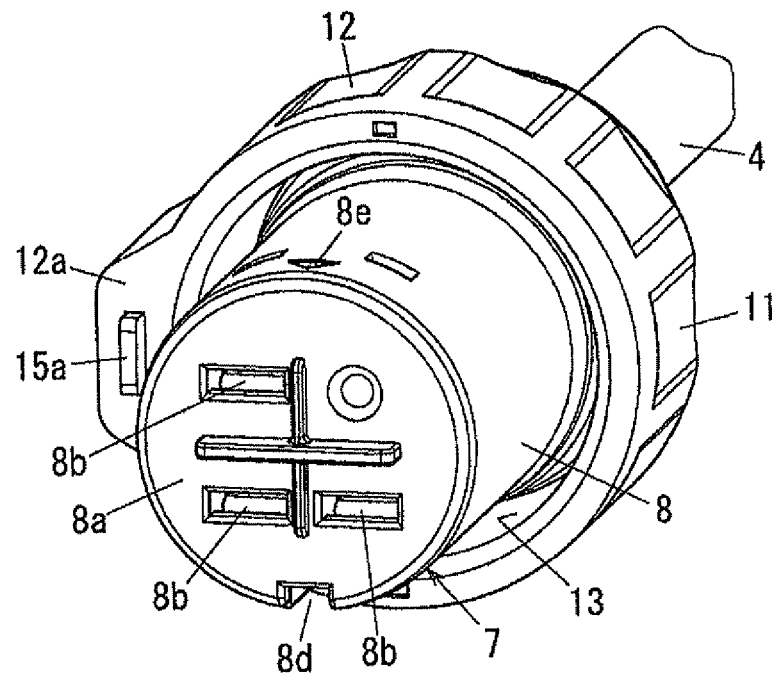
FIG. 2A is a perspective view of a plug provided to the second cable of the power feeding control device shown in FIGS. 1A and 1B.
Figure 2B:
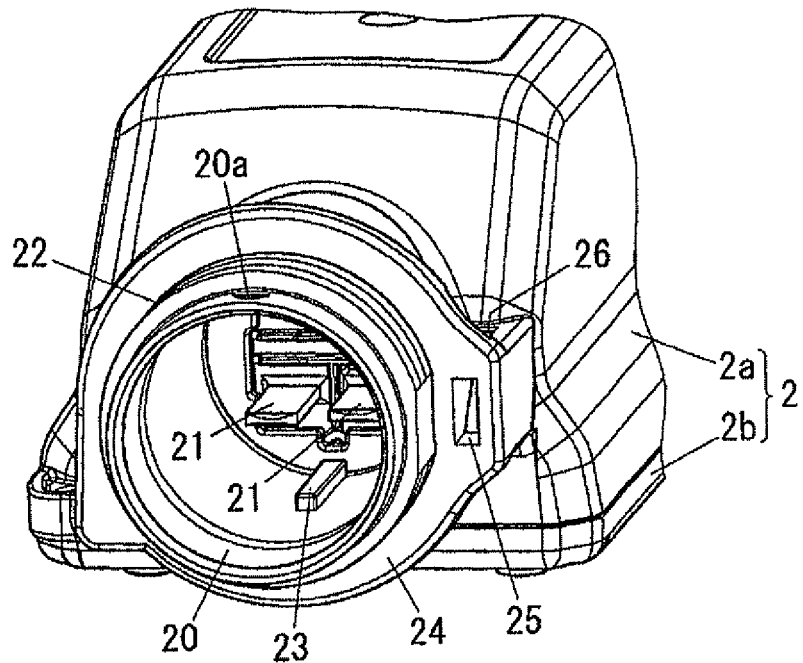
FIG. 2B is an enlarged perspective view of a socket part provided in a main body of the power feeding control device.
Figure 3A:
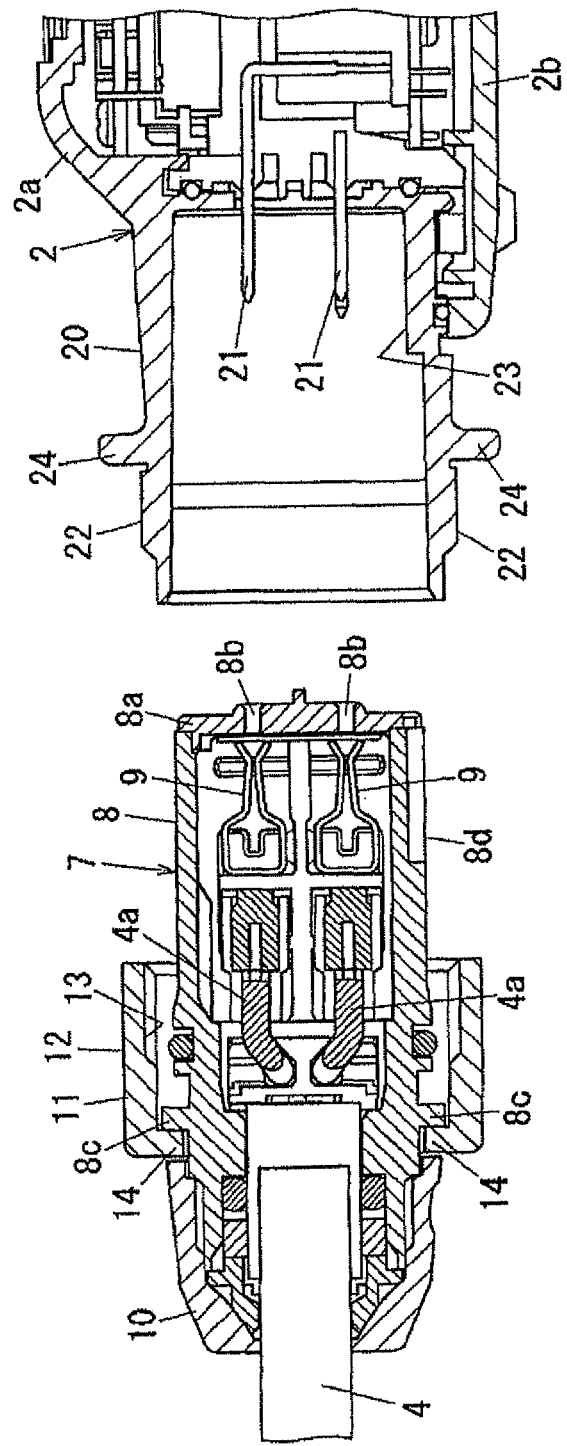
FIG. 3A is a cross sectional view of the plug and the socket part in FIGS. 2A and 2B before they are connected to each other.
Figure 3B:
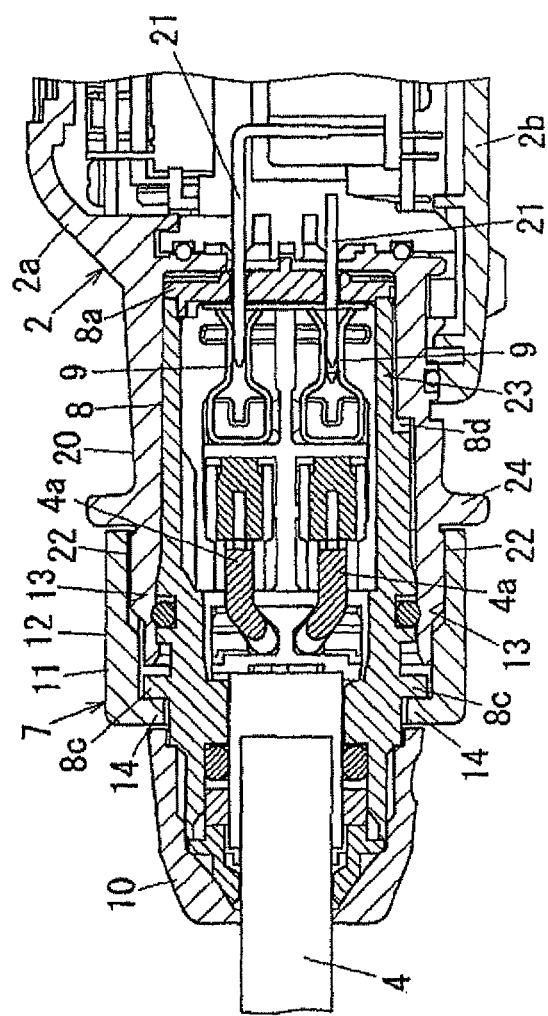
FIG. 3B is a cross sectional view of the plug and the socket part after they are connected to each other.

FIG. 1A is an external view of the power feeding control device 1, which mainly includes a main body 2, a first cable 3, and a second cable 4.

The main body 2 has a box-like body 2a whose one surface is opened and a cover 2b covering the opening of the body 2a and is formed into a substantially rectangular box-like shape. Within the main body 2, an electric circuit 30 (see FIG. 10) that controls the power supply to the motor vehicle from the power source is accommodated.

The first cable 3, which is used in electrically connecting the electric circuit accommodated in the main body 2 to the electric storage device in the motor vehicle, is extended from one longitudinal end of the main body 2. The first cable 3 is constituted by two power lines and one signal line for transmitting signals to and from the motor vehicle. Provided at the leading end of the first cable 3 is a vehicle side plug 5 (what is called a charging gun) which is adapted to be disconnectably connected to a power receiving socket (not shown) provided in the motor vehicle.

The second cable 4, which is used in electrically connecting the electric circuit 30 accommodated in the main body 2 to a power outlet installed in such as a wall of a building, is extended from the other longitudinal end of the main body 2. The second cable 4 is constituted by two power lines and one ground line. Provided at the leading end of the second cable 4 is a power source side plug 6 which is adapted to be inserted into the power receptacle. Herein, a power feeding path from the power source to the motor vehicle is established by the two power lines provided in each of the first cable 3 and the second cable 4, internal wirings in the main body 2 electrically connected to the respective two power lines, and the like.

Figure 10:
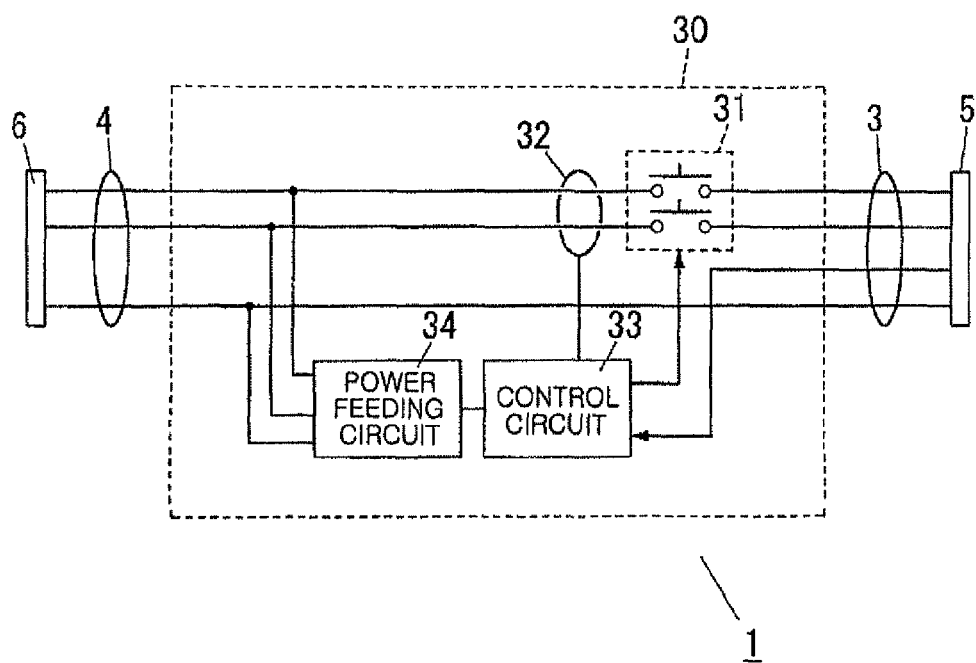

Next, the electric circuit 30 accommodated in the main body 2 will be described with reference to a block diagram in FIG. 10.

The electric circuit 30 includes a relay 31, a zero-phase current transformer (ZCT) 32, a control circuit 33, and a power feeding circuit 34.

The relay 31 has relay contacts provided on the power feeding path between the power source and the motor vehicle, and switches ON and OFF the relay contacts in response to control signals from the control circuit 33 so that the power feeding path from the power source to the motor vehicle is opened and closed.

The zero-phase current transformer 32, through which the two power lines provided at the primary side (power source side) of the relay 31 are extended, serves to detect unbalanced current caused by the leakage on the vehicle side, and an output signal thereof is inputted into the control circuit 33.

The control circuit 33, which mainly includes a microcomputer, controls each component of the power feeding control device 1 collectively. Based on a charging state signal (what is called a CPLT (device-side control pilot) signal) inputted from the electric storage device in the motor vehicle through the first cable 3, the control circuit 33 controls ON and OFF of the relay 31, thereby opening and closing the power feeding path to the motor vehicle from the power source. When occurrence of the unbalanced current is detected on the basis of the detecting output of the zero-phase current transformer 32, the control circuit 33 determines that the leakage occurs on the vehicle side, and makes the relay 31 opened to interrupt the power supply to the motor vehicle. Thus, the leakage protection operation is performed. Note that, when the leakage protection operation is performed, the control circuit 33 preferably informs users of the leakage occurrence by blinking a lamp or sounding a buzzer and a loudspeaker to make a warning sound.

The power feeding circuit 34 obtains electric power from the primary side of the relay 31 to generate power for operating the control circuit 33 and the like.

The electric circuit 30 accommodated in the main body has the aforementioned configurations, and the power supply from the power source to the motor vehicle is controlled by the electric circuit 30.

In the power feeding control device 1 of the present embodiment, since the first cable 3 on the vehicle side is connected to a terminal box (not shown) within the main body 2, the main body 2 is needed to be disassembled when the first cable 3 is replaced. On the other hand, the second cable 4 on the power source side is connected to the main body 2 through a connector.

Now, a connecting part between the second cable 4 and the main body 2 will be described in detail with reference to FIGS. 1A to 4.

At one end of the second cable 4, there is provided a plug 7 disconnectably connected to the socket part 20 provided in the main body 2. The plug 7 includes a plug body 8 formed into a cylindrical shape by using synthetic resin. A front opening of the plug body 8 (on the side of the main body 2) is covered with a lid plate 8a made of resin. The lid plate 8a has three insertion holes 8b into which plug blades 21 (first contact) provided in the socket part 20 are respectively to be inserted. Blade receivers 9 (second contact) electrically connected to respective wires 4a of the second cable 4 are accommodated within the plug body 8 to correspond to the respective insertion holes 8b. A thread portion (not shown) is provided on an outer peripheral surface of a rear portion (opposite to the main body 2) of the plug body 8. A cap 10 is screwed onto the thread portion to cover a rear opening of the plug body 8. A retaining ring 11 with a substantially cylindrical shape is rotatably attached to the plug body 8 while being restricted to move in an axial direction of the plug body 8. The retaining ring 11 is formed of synthetic resin. A thread portion 13 is formed on a front inner surface of a cylindrical peripheral wall 12 of the retaining ring 11, and a ring-shaped flange 14 is provided to extend from a rear end of the peripheral wall 12 inwardly toward a central axis thereof. Herein, the flange 14 is interposed between a rib 8c protruded from an outer peripheral surface of the plug body 8 and the cap 10 attached to the rear portion of the plug body 8, so that the retaining ring 11 is restricted to move in the axial direction of the plug body 8. In this state, a clearance is provided between the flange 14 and the outer peripheral surface of the plug body 8, which allows retaining ring 11 to be rotated relative to the plug body 8.

In the main body 2, the socket part 20 to which the above plug 7 is disconnectably connected is provided integrally with the body 2a. Within the cylindrical socket part 20, three plug blades 21 are arranged at predetermined intervals, the plug blades 21 being configured to be inserted into and connected to the respective blade receivers 9 of the plug 7. These plug blades 21 are electrically connected to the above-described electric circuit 30 accommodated in the main body 2. On an outer peripheral surface of the socket part 20, there is provided a thread portion 22 to be engaged with the thread portion 13 of the retaining ring 11. Within the cylindrical socket part 20, there is provided a fitting key 23 extended along a direction of connecting and disconnecting the plug 7 (in the axial direction) and engaged with a key groove 8d formed on the outer peripheral surface of the plug body 8. A mark 20a for alignment (e.g., a graphic symbol such as "Δ") is formed on the outer peripheral surface of the socket part 20 by molding or printing, in which the mark 20a is positioned on an upper side of the socket part 20 in the state where the main body 2 is placed on the ground with the cover 2d directed downward. On the outer peripheral surface of the plug body 8, a mark 8e (e.g., a graphic symbol such as "Δ") is formed by molding or printing so as to correspond to the above mark 20a in the state where the key groove 8d and the fitting key 23 are aligned with each other. Note that another pattern other than a triangle may be employed as the mark 20a and the mark 8e, and the marks 20a and 8e may be formed by using another method other than molding or printing.

Figure 4:
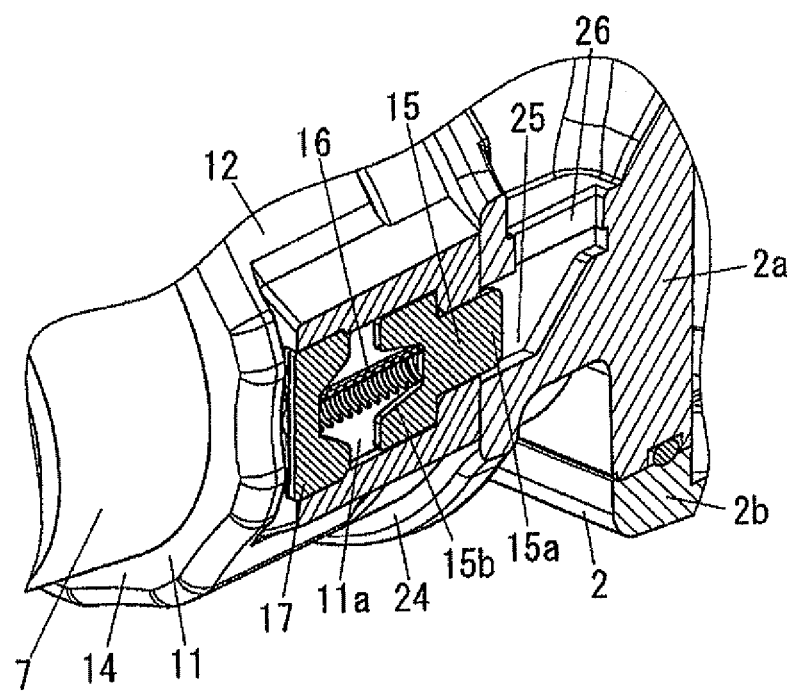
FIG. 4 is a cross sectional view showing the state where the plug is locked to the socket part.

As shown in FIG. 4, in a part of the retaining ring 11, a slit lie is extended through the retaining ring 11 in a back and forth direction (the central axis direction). The slit lie has a front opening (on the side of the main body 2) with an area smaller than that of a rear opening thereof. A latch piece 15 of a substantially Y-shape is disposed in the slit 11a to be movable in the back and forth direction. One end of the latch piece 15 is protruded out of the front opening of the slit 11a as a protrusion part 15a, i.e., the latch piece 15 is provided such that its peripheral portion is covered with the retaining ring 11 and its leading end is exposed out of the slit 11a. A cylindrical-shaped recess is provided at the center portion of the slit 11a to extend in the axial direction of the retaining ring 11, and a coil spring 16 is inserted therein. A front end of the coil spring 16 is in contact with a recess portion 15b, which is formed in the other end of the latch piece 15. A fixing piece 17 is press-fitted in the rear opening of the slit 11a, so that the coil spring 16 is held between the latch piece 15 and the fixing piece 17. Thus, the coil spring 16 serving as a biasing member elastically biases the latch piece 15 toward the main body 2. Meanwhile, in the socket part 20, there is provided a flange 24 that is in contact with an end face 12a of the peripheral wall 12 in the state where the retaining ring 11 is screwed onto the socket part 20. In the flange 24, there is formed a recessed slot 25 into which the protrusion part 15a of the latch piece 15 is inserted when the thread portion 13 of the retaining ring 11 is screwed onto the thread portion 22 of the socket part 20 to a normal position. Further, on the top surface of the body 2a, there is provided a communicating hole 26 which communicates with the recessed slot 25.

The plug 7 and the socket part 20 are configured as mentioned above. Next, a process of connecting the plug 7 to the socket part 20 will be described with reference to FIGS. 5A to 5D.

Figure 5A:
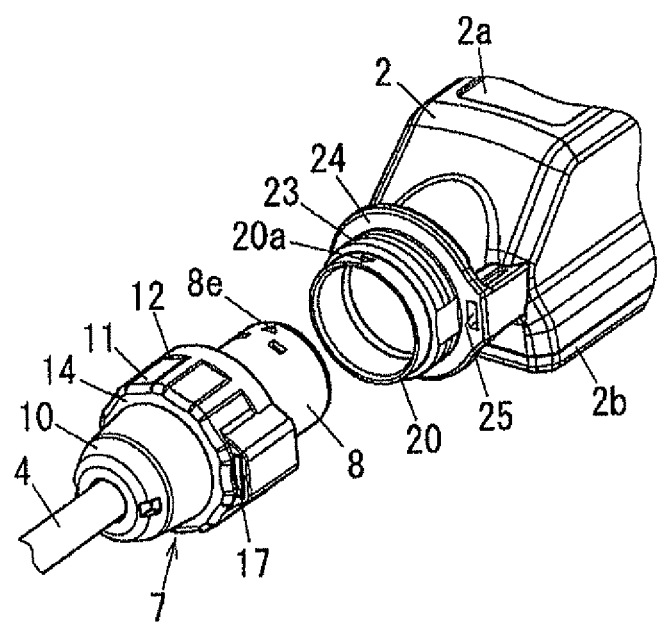
FIGS. 5A to 5D are explanatory views describing a process for connecting the second cable to the main body.
Figure 5B:
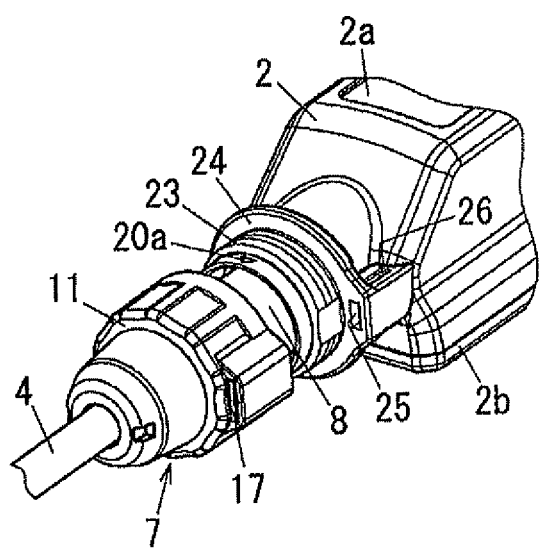
Figure 5C:
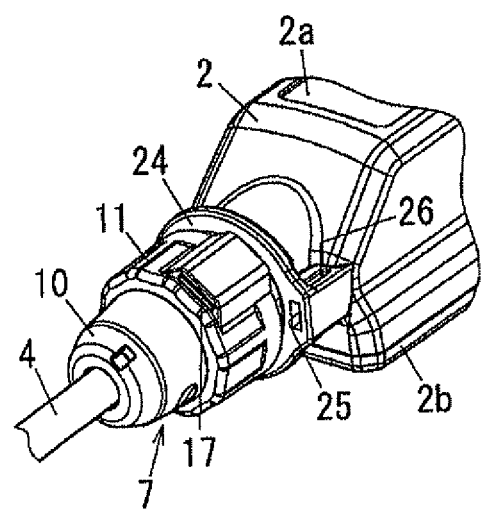
Figure 5D:
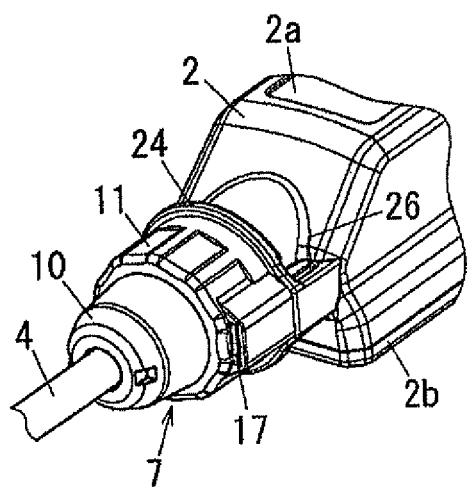

First of all, as shown in FIG. 5A, an operator aligns the mark 8e of the plug 7 with the mark 20a of the socket part 20, i.e., aligns the fitting key 23 with the key groove 8d, and then inserts the leading end of the plug body 8 into the socket part 20 as shown in FIG. 5B. When the lid plate 8a provided at the front end of the plug body 8 is inserted into the socket part 20 to the deepest portion as shown in FIG. 5C, the plug blades 21 of the socket part 20 are inserted into the cylindrical plug body 8 through the respective insertion holes 8b of the lid plate 8a, so that the plug blades 21 and the blade receivers 9 are electrically connected. In this state, since the protrusion part 15a of the latch piece 15 protruding from the front end surface of the retaining ring 11 is not in contact with the flange 24 and is not inserted into the recessed slot 25, the retaining ring 11 can be rotated. In this state, when the operator rotates the retaining ring 11 to allow the thread portion 13 of the retaining ring 11 to be screwed onto the thread portion 23 of the socket part 20, the retaining ring 11 moves forward while rotating. Then, when the protrusion part 15a comes into contact with the flange 24 as the retaining ring 11 moves forward, the coil spring 16 is compressed to allow the protrusion part 15a to move rearward. After that, when the retaining ring 11 is screwed to a predetermined position, the protrusion part 15a is inserted into the recessed slot 25. At this time, the protrusion part 15a is engaged with the recessed slot 25 to restrict the rotation of the retaining ring 11, thereby preventing the disconnection of the retaining ring 11. This reduces a possibility of the disconnection of the plug 7 from the socket part 20 unintentionally.

Figure 6A:
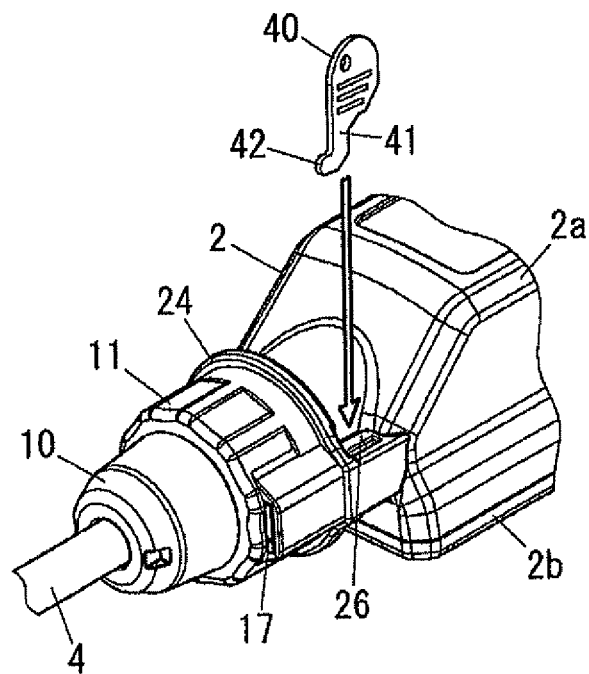
FIGS. 6A and 6b are a perspective view and a cross sectional view showing a process of separating the second cable from the main body, respectively.
Figure 6B:
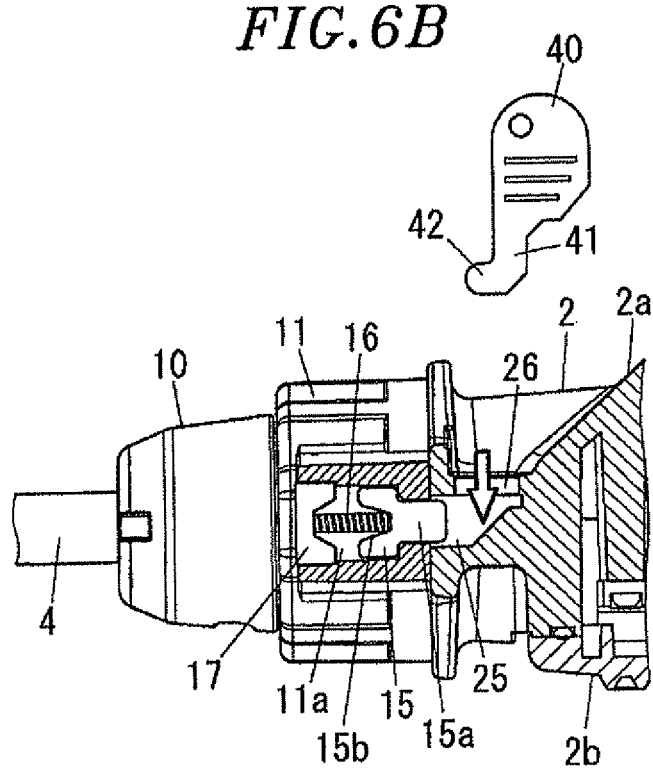

Next, a process of disconnecting the plug 7 from the socket part 20 will be described with reference to FIGS. 6A to 8B. In order to release the locked state by the latch piece 15, a release key 40 shown in FIGS. 6A and 6B is used. The release key 40, for example, is formed of a metal plate by pressing and has such a size that the operator can hold it by his/her fingers. The release key 40 has a substantially L-shaped operation piece 41 to be inserted into the communicating hole 26, the operation piece 41 being integrally formed with the release key 40. A horizontal portion of the operation piece 41 has a width in the back and forth direction substantially the same as that of the communicating hole 26, and a vertical portion thereof has a width in the back and forth direction narrower than that of the communicating hole 26.

Figure 7:
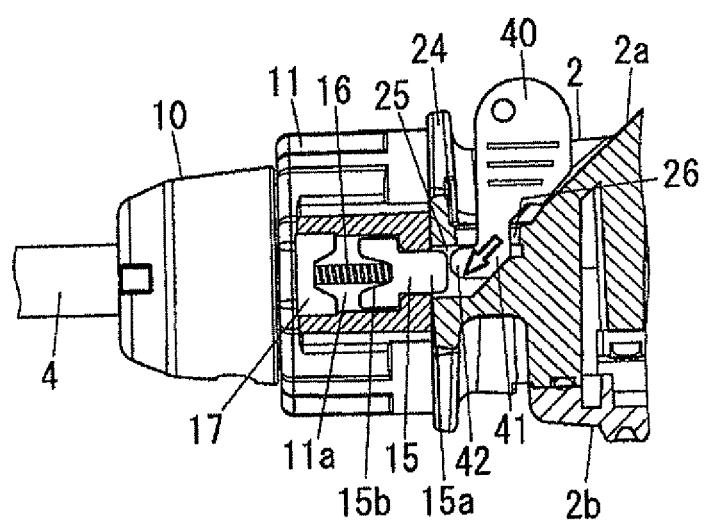
FIG. 7 is a cross sectional view showing the process of separating the second cable from the main body.
Figure 8A:
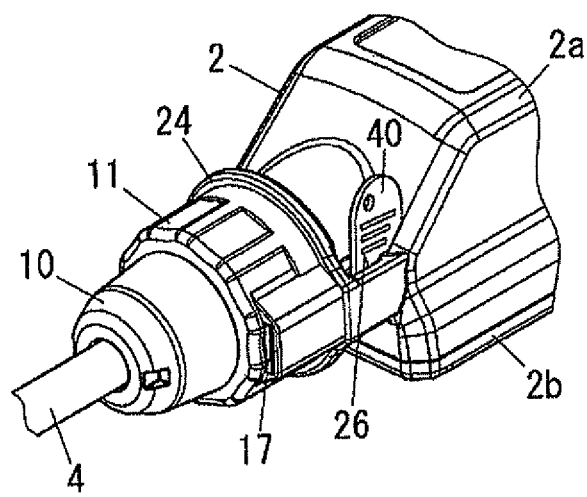
FIGS. 8A and 8B are a perspective view and a cross sectional view showing the process of separating the second cable from the body part, respectively.
Figure 8B:
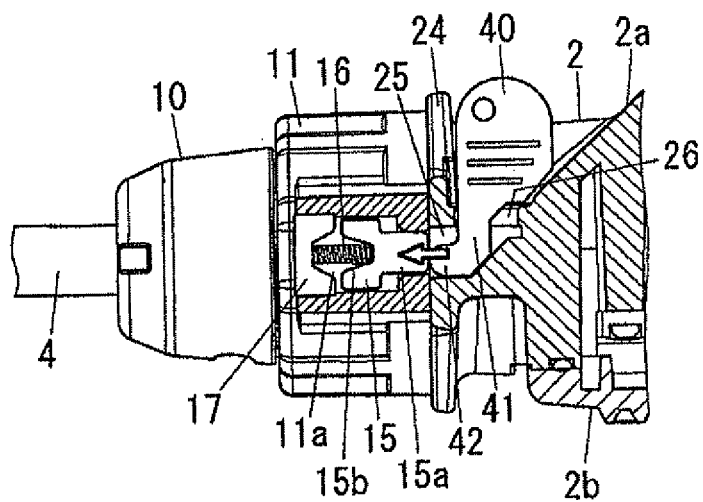

First of all, the operator holds the release key 40 and, as shown in FIGS. 6A and 6B, inserts the operation piece 41 of the release key 40 into the communicating hole 26 from above. When the horizontal portion of the operation piece 41 is inserted into the communicating hole 26 as shown in FIG. 7, a taper portion provided at a rear side (opposite to the plug 7) of the horizontal portion contacts with a taper portion provided at the deeper side of the communicating hole 26, whereby the operation piece 41 is moved diagonally forward (toward the plug 7). Then, the operator inserts the release key 40 to the deepest portion of the communicating hole 26 as shown in FIGS. 8A and 8B, whereby a protuberance 42 provided at a tip end of the horizontal portion of the operation piece 41 pushes the protrusion part 15a against the biasing force of the coil spring 16, so that the protrusion part 15a is pushed out of the recessed slot 25. In this way, since the engagement state of the latch piece 15 and the recessed slot 25 is released, the operator can rotate the retaining ring 11 in a releasing direction (opposite to the screwing direction) to disconnect the thread portion 13 of the retaining ring 11 from the thread portion 22 of the socket part 20. Subsequently, the plug 7 is taken out of the socket part 20 to be removed from the socket part 20.

As described above, in the power feeding control device 1 of the present embodiment, the first cable 3 to be connected to the motor vehicle and the second cable 4 to be connected to the power source are extended from the main body 2 that accommodates the electric circuit 30 for controlling the power supply to the motor vehicle from the power source. The second cable 4 includes the second contact (the blade receivers 9) that are electrically connected to the first contact (the plug blades 21) provided in the main body 2; and the retaining part (the retaining ring 11) that is detachably attached to the main body 2 by screwing and retains the state where the second contact is electrically connected to the first contact.

In this way, since the retaining part is attached to the main body 2 by screwing it onto the main body 2, the connection and disconnection of the retaining part can be made easier, and consequently the second cable 4 can be easily connected to and disconnected from the main body. Therefore, in cases where the second cable 4 is damaged, easy replacement of the second cable 4 can advantageously be performed by disconnecting the retaining part from the main body 2. Further, the power plug may have different kinds of pole arrangements depending on areas. Even if the power feeding control device 1 is used in an area where a different pole arrangement is employed, the power plug 6 can be replaced easily with another one corresponding to the area.

Note that, in the present embodiment, the second contact and the retaining part are provided in the second cable 4, and the second cable 4 is detachably attached to the socket part 20 of the main body 2. The second contact and the retaining part, however, may be provided in the first cable 3 such that the first cable 3 is detachably attached to the main body 2. Like the above, this makes it possible that the first cable 3 is attached to and detached from the main body 2 easily. Further, the second contact and the retaining part may be provided in each of the first cable 3 and the second cable 4, in which the first cable 3 and the second cable 4 can be detachably attached to the main body 2.

At one (the retaining part in the present embodiment) of the retaining part (the retaining ring 11) and the main body 2, there is provided the protrusion part 15a protruding toward the other (the main body 2 in the present embodiment). At the other (the main body 2) of the retaining part and the main body 2, there is provided the locking part (the recessed groove 25) for locking the protrusion part 15a after the retaining part is screwed onto the main body 2 to the position where the first contact (the plug blades 21) is electrically connected with the second contact (the blade receivers 9).

In such manner, the protrusion part 15a and the locking part are engaged to restrict the retaining part to rotate, so that the first and second contacts remain connected electrically. This avoids an improper connection of the first and second contacts. Further, with the aid of the protrusion part 15a and the locking part locked, the user can advantageously verify that the first and second contacts are electrically connected.

Note that, in the present embodiment, the protrusion part 15a is provided in the retaining part (the retaining ring 11), and the locking part (the recessed slot 25) for locking the protrusion part 15a is provided in the main body 2. The protrusion part 15a, however, may be provided in the main body 2 and the locking part may be in the retaining part.

Further, the present embodiment includes the biasing part for biasing the protrusion part 15a toward the other side of the retaining part (retaining ring 11) and the main body 2, and the locking part is formed to have a recessed shape into which the protrusion part 15a is inserted.

When the protrusion part 15a is inserted into the recess shaped locking part (the recessed slot 25), a biasing force of the biasing spring 16 keeps the protrusion part 15a inserted in the locking part. This makes it difficult to release the engagement of the protrusion part 15a and the locking part. Therefore, the retaining part becomes hard to be disconnected from the main body 2, so that the cable is ensured to remain attached to the main body.

Further, in present embodiment, the protrusion part 15a is provided such that the peripheral portion thereof is covered by one of the retaining part and the main body (the retaining ring 11 in the present embodiment). An opening for exposing the protrusion part, which is inserted into the recess shaped locking part, is provided in a surface of the other of the retaining part and the main body.

Accordingly, the protrusion part 15a is exposed only through the locking part (the recessed slot 25), thereby avoiding the protrusion part 15a and the locking part (recessed groove 25) from being disengaged unintentionally. Moreover, some tool is inserted into the opening to push the protrusion part 15a, whereby the protrusion part 15a can be removed out of the recess shaped locking part. This releases the engagement of the protrusion part 15a and the locking part.

In the present embodiment, since the recess shaped locking part is provided in the main body 2, the opening is also provided therein. In cases where the locking part is provided in the retaining part, however, the opening for exposing the protrusion part inserted into the locking part may be provided in the retaining part.

By the way, in the present embodiment, in order to make it easier to release the engagement of the protrusion part 15a and the recessed groove 25, the release key 40 is inserted through the communicating hole 26 to release the engagement. Without using such tool as the release key 40, however, the engagement of the protrusion part 15a and the recessed groove 25 may be released by hand.

Figure 9A:
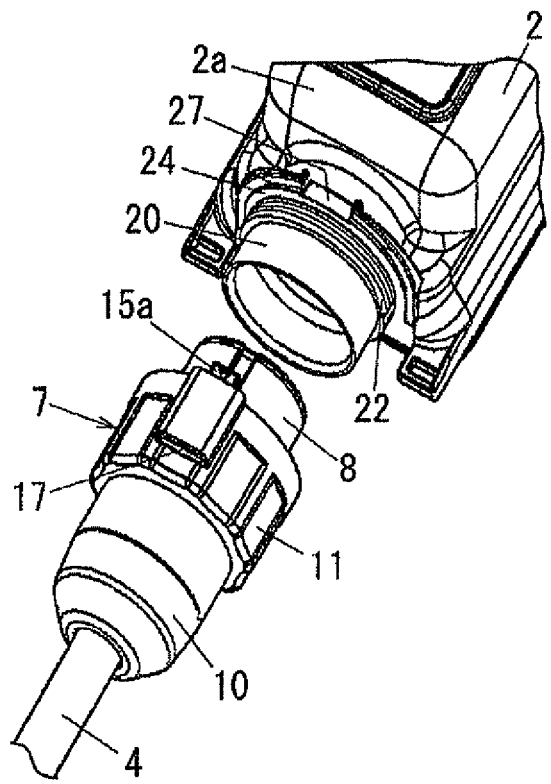
Figure 9B:
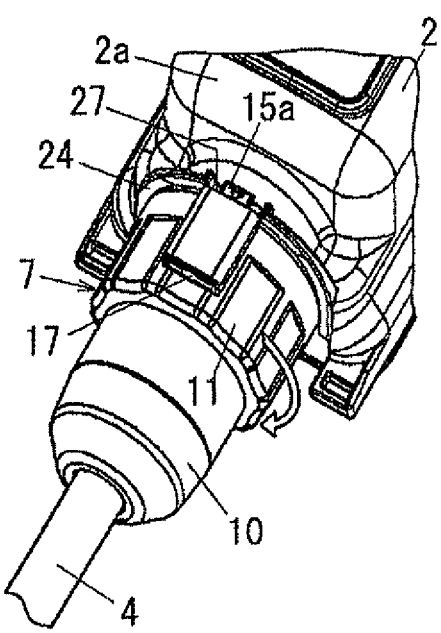

For instance, as shown in FIGS. 9A and 9B, the flange 24 provided in the socket part 20 may partially be recessed to form a locking groove 27 to which the protrusion part 15a is locked. Thus, the recess shaped locking part, to which the protrusion part 15a is locked, may be changed into the locking groove 27, so that the protrusion part 15a inserted into the locking groove 27 can be exposed to the surface of the main body 2 (see FIG. 9B). This allows the user to push the protrusion part 15a locked to the locking groove 27 by a finger without using any tool, so that the engagement of the protrusion part 15a and the locking groove 27 can be released, thereby making it possible to disconnect the second cable from the main body 2 easily.

While the invention has been shown and described with respect to the embodiments, it will be understood by those skilled in the art that various changes and modification may be made without departing from the scope of the invention as defined in the following claims.

What is claimed is:

1. A power feeding control device comprising:
a first cable configured to be connected to a motor vehicle;
a second cable connected to a power source; and
a main body accommodating an electric circuit for controlling power supply from the power source to the motor vehicle, the main body including a socket part and plug blades provided inside the socket part without protruding beyond a leading edge of the socket part,
wherein at least one of the first cable and the second cable is provided with:

a plug body accommodating therein blade receivers configured to be electrically connected to the plug blades of the main body; and a retaining part configured to be detachably attached to the main body by screwing to retain a connection state where the is blade receivers are electrically connected to the plug blades, wherein the plug body is configured to be inserted into the socket part, so that the connection state is made after a leading end of the plug body is inserted into the socket part.

2. The power feeding control device according to claim 1, wherein one of the retaining part and the main body is provided with a protrusion part protruding toward the other thereof; and the other of the retaining part and the main body is provided with a locking part for locking the protrusion part after the retaining part is screwed onto the main body to a position where the plug blades are electrically connected with the blade receivers.

3. The power feeding control device according to claim 2, wherein the one of the retaining part and the main body is provided with a biasing part for biasing the protrusion part toward the other of the retaining part and the main body, and wherein the locking part is formed to have a recessed shape into which the protrusion part is inserted.

4. The power feeding control device according to claim 3, wherein the protrusion part is provided such that a peripheral portion thereof is covered with the one of the retaining part and the main body, and wherein an opening for exposing the protrusion part inserted into the locking part is provided in a surface of the other of the retaining part and the main body.

5. The power feeding control device according to the claim 1, wherein the retaining part is attached to the plug body such that the retaining part is rotatable about an axial direction of the plug body while being restricted to move in the axial direction.

* * * * *